United States Patent [19]

Dauphinee

[11] 4,388,829
[45] Jun. 21, 1983

[54] EVAPORATION TYPE BAROMETER

[75] Inventor: Thomas M. Dauphinee, Ottawa, Canada

[73] Assignee: Canadian Patents & Development Limited, Ottawa, Canada

[21] Appl. No.: 308,468

[22] Filed: Oct. 5, 1981

[51] Int. Cl.³ .............................................. G01L 7/08
[52] U.S. Cl. ..................................................... 73/384
[58] Field of Search ................. 73/384, 755, 753, 707, 73/786, 787

[56] References Cited

U.S. PATENT DOCUMENTS

| 2,599,276 | 6/1952 | Norman | 73/384 |
| 3,238,781 | 3/1966 | Peters | 73/384 |
| 3,276,262 | 10/1966 | Sapoff et al. | 73/384 |
| 4,197,743 | 4/1980 | Dauphinee | 73/384 |

Primary Examiner—Donald O. Woodiel
Attorney, Agent, or Firm—Edward Rymek

[57] ABSTRACT

A barometer of the evaporation or hypsometer type comprising an enclosed cylindrical bulb partially filled with a working fluid, a first temperature measuring device positioned in the bulb for measuring the temperature of the working fluid therein, a relatively thin extended tube connected to and extending upward from the bulb, a second temperature measuring device positioned on the tube at a position away from the bulb for measuring the temperature of the working fluid at that location, an electrical heater associated with the bulb for bringing the working fluid to the evaporation temperature, a mechanism for transmitting ambient pressure to the inside of the tube-bulb combination and preventing escape of working fluid connected to the upper end of the tube, electrical means connected to the heater for providing a heating current thereto, control means connected to the second temperature measuring device and the electrical means for controlling the level of heating current provided to the heater, and output means connected to the first temperature measuring device for providing an output voltage, said voltage being related to the ambient barometric pressure.

9 Claims, 4 Drawing Figures

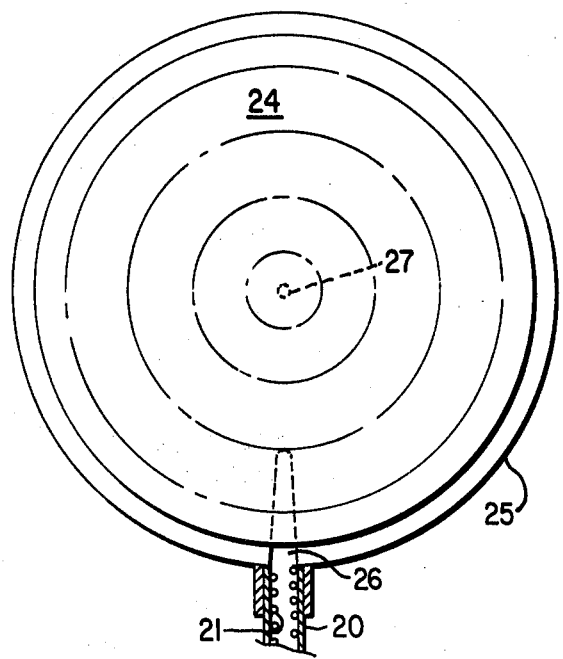
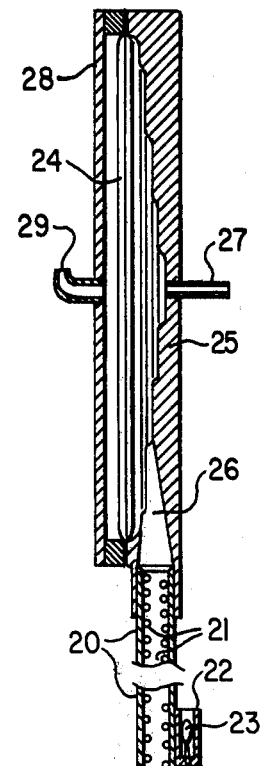
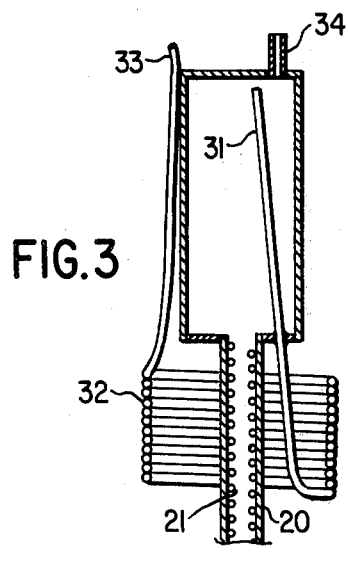
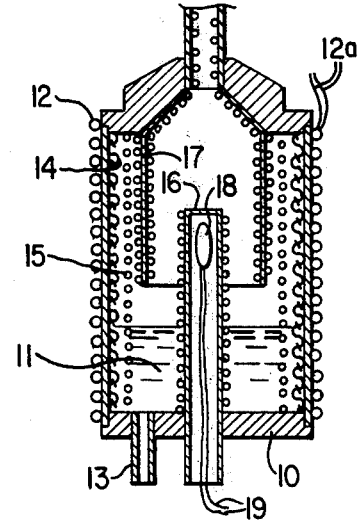
FIG. 2
FIG. 3
FIG. 1

EVAPORATION TYPE BAROMETER

This invention relates to an evaporation type barometer.

Barometers of the evaporation or hypsometer type are well known and have been in use for many years. Representative of this type of barometer are the following patents:

U.S. Pat. No. 2,599,276—W. R. Norman—June 3, 1952,

U.S. Pat. No. 3,276,262—M. Sapoff et al—October 4, 1966.

It is an object of the present invention to provide a barometer that has long term stability and requires a small amount of power for remote applications.

This and other objects of the invention are achieved by a barometer of the evaporation or hypsometer type comprising an enclosed cylindrical bulb partially filled with a working fluid, a first temperature measuring device positioned in the bulb for measuring the temperature of the working fluid therein, a relatively thin extended tube connected to and extending upward from the bulb, a second temperature measuring device positioned on the tube at a position away from the bulb for measuring the temperature of the working fluid at that location, an electrical heater associated with the bulb for bringing the working fluid to the evaporation temperature, a mechanism for transmitting ambient pressure to the inside of the tube-bulb combination and preventing escape of working fluid connected to the upper end of the tube, electrical means connected to the heater providing a heating current thereto, control means connected to the second temperature measuring device and the electrical means for controlling the level of heating current provided to the heater, and output means connected to the first temperature measuring device for providing an output voltage, said voltage being related to the ambient barometric pressure.

In the preferred version, the ambient pressure transmitting device is a thin, slack diaphragm mounted in a frame to define an enclosed inner cavity connected to the upper end of the tube and positioned such that any liquid condensed in this diaphragm region can run back down the tube.

In drawings which illustrate embodiments of the invention,

FIG. 1 is a cross-section of the barometer assembly,

FIG. 2 shows the upper end structure and the diaphragm,

FIG. 3 is a cross-section of an alternative upper end structure, and

Figure 4:
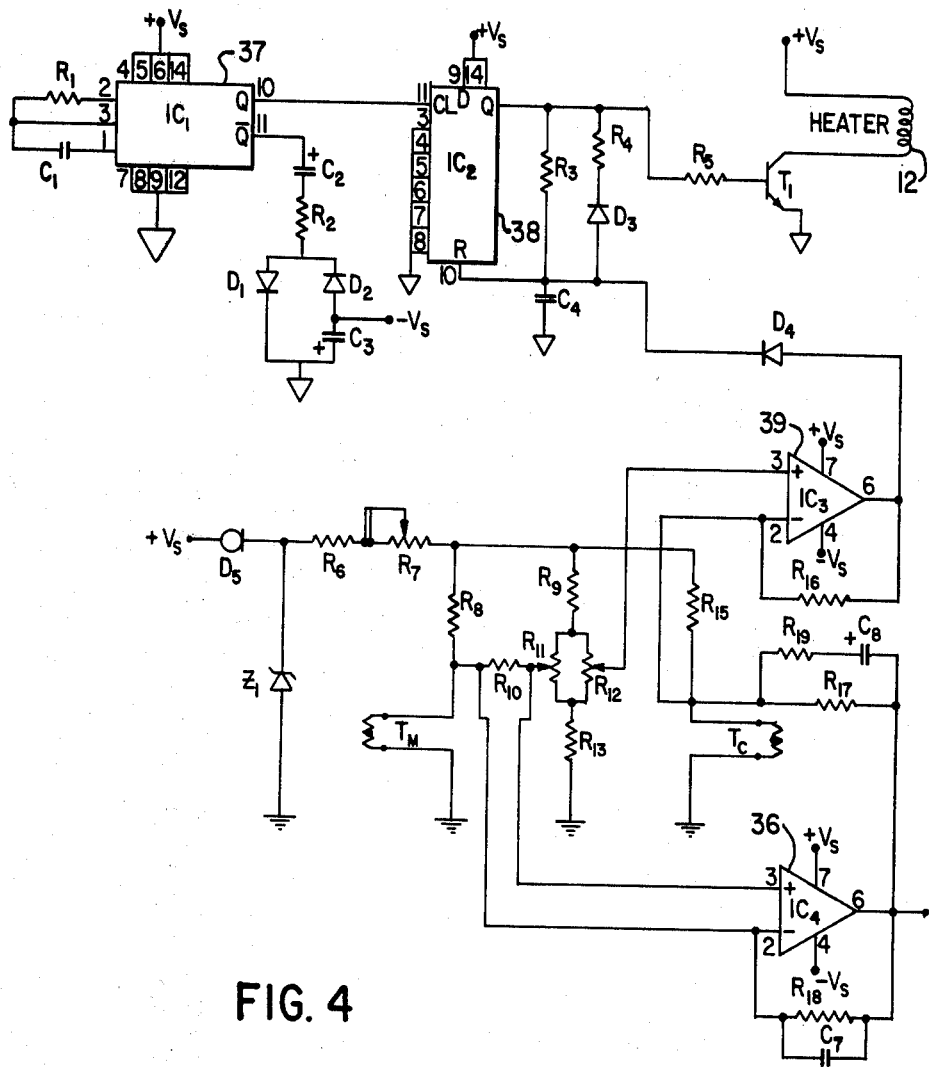
FIG. 4 is a diagram of the power, control, and readout circuit.

Referring to FIG. 1, the barometer consists of a cylindrical evaporation bulb 10 filled with a working fluid 11 (normally carbon disulphide, $CS_2$) to a level as shown and having a heater 12 connected to heater leads 12a wound on the outside. A cloth wick 14 and a helical wire coil 15 are positioned around the inside of bulb 10. It has been found that the device works well without a wick provided the helix is closely spaced e.g. about 30% coverage. A thin thermistor well 16 projects upwards from the bottom of the bulb with a radiation shield 17 projecting down from the top around it. These elements also have helical wires wound over their surfaces. A thermistor 18 is positioned in well 16 and is connected by leads 19 to the external power and control circuitry. Sealed off port 13 is for purposes of filling and draining of fluid, cleaning etc. A relatively small diameter tube 20 extends upward from the bulb and has on its inner wall a helical wire coil 21. A second thermistor well 22 is mounted external to and in close thermal contact with this tube and has mounted inside a second thermistor 23 connected to external circuitry by leads 23a. The bulb and inlet tube in operation would normally be enclosed in a close fitting dewar over their length to reduce power consumption at the bulb operating temperature (approx. 46.5° C. for $CS_2$).

The top end of tube 20 is connected to a mechanism for transmitting ambient pressure while preventing escape of the working fluid. The preferred transfer mechansim is a very thin (approximately 0.01 mm) slack beryllium copper diaphragm 24 mounted on edge in a vertical position in such a way that any liquid condensed in the diaphragm region can run back down the tube. The diaphragm is preferably circular in configuration and is mounted on a back plate 25 recessed as shown to allow movement of the diaphragm. As also shown in FIG. 2 the interior of this upper end structure is connected to tube 20 through slot 26 formed in plate 25. Port 27 is used for filling the device and is sealed off in operation. For operational use a front cover plate 28 having an opening 29 to atmosphere would be positioned over the diaphragm as shown.

FIG. 3 illustrates a variant form of the upper end structure. In this case the upper end of tube 20 is enlarged and contains a tube 31 that passes to the exterior and is formed into a coil 32 left open to atmosphere at 33. This long tube provides in effect a slow acting, pressure maintaining connection to atmosphere. Filling port 34 completes the structure.

Thermistors 18 and 23 of FIG. 1 are connected to the measuring and control circuit shown in FIG. 4 where they appear as measuring thermistor Tm and control thermistor Tc respectively. Thermistor Tm is connected into a simple bridge (resistors R8, R9, R11, R13) powered from a supply (Vs) regulated by diode D5, zener Z1, and resistor R6, R7. The voltage across resistor R10 of the bridge is applied to inverting amplifier 36 which gives the barometric pressure readout. It is convenient to make the system described give a sensitivity of 50 mv./mbar so that the full 100 mbar range of pressures encountered will give a voltage swing of 5 V.

Heater 12 of FIG. 1 is connected to the control circuitry of FIG. 4. Heater current is supplied from a 12 V d.c. (unregulated) supply (Vs). Heater power is pulsed full-on full-off approximately 100 times per second with power input varied at 100% efficiency by controlling the duration of the pulses. Control pulses are engendered in integrated circuits with the pulses applied to transistor T1 in the heater circuit. Thermistor Tc connected into a second bridge circuit (resistors R9, R12, R13, and R15). Bridge output is applied to amplifier 39 giving a voltage output that controls via diode D3 the pulse duration of the heater current. The output of the bridge is compensated for variations of bulb temperature due to barometric pressure by means of input to the bridge from the output of amplifier 36. Power is controlled to br-ng thermistor Tc mounted on the thin tube, which received heat only by condensation or conduction, to a temperature slightly lower than the thermistor Tm in the bulb 10 (FIG. 1).

Experimental experience has shown that excellent long term stability can be obtainable at heater power levels of 20–30 mW for normal room ambient temperature. Response time constant and noise level are of the order of 0.5 second and 1 pascals respectively.

I claim:

1. A barometer of the evaporation or hypsometer type comprising:
   (a) an enclosed cylindrical bulb partially filled with a working fluid,
   (b) a first temperature measuring device positioned in the bulb for measuring the temperature of the working fluid therein,
   (c) a relatively thin extended tube connected to and extending from the bulb,
   (d) a second temperature measuring device positioned on the tube at a position away from the bulb for measuring the temperature of the working fluid at that location,
   (e) an electrical heater associated with the bulb for bringing the working fluid to the evaporation temperature,
   (f) a mechanism for transmitting ambient pressure to the inside of the tube-bulb combination and preventing escape of working fluid connected to the upper end of the tube,
   (g) electrical means connected to the heater for providing a heating current thereto,
   (h) control means connected to the second temperature measuring device and the electrical means for controlling the level of heating current provided to the heater, and
   (i) output means connected to the first temperature measuring device for providing an output voltage, said voltage being related to the ambient barometric pressure.

2. A barometer as in claim 1 wherein the mechanism for transmitting ambient pressure to the inside of the tube-bulb combination is a diaphragm mounted in a frame structure defining an enclosed cavity having an open passage to the inside of said tube.

3. A barometer as in claim 2 wherein the diaphragm is formed in thin slack, benyllium-copper metal sheet.

4. A barometer as in claim 2 wherein the diaphragm is mounted in a vertical position such that in operation any liquid condensed in the diphragm region can run back down the tube.

5. A barometer as in claim 1 wherein the mechanism for transmitting ambient pressure to the inside of the tube-bulb combination is an end fitting enclosing the upper end of the tube and a relatively long, thin tubing leading and providing an open passegeway from the inside of the fitting to the exterior.

6. A barometer as in claim 5 wherein the tubing has formed in its length a coil encircling the said tube.

7. A barometer as in claim 1 wherein the first and second temperature measuring devices are thermistors.

8. A barometer as in claim 1 or claim 2 wherein the electrical means connected to the heater is a pulse generator providing heating current pulses to the heater and the control means is means for varying the pulse duration.

9. A barometer as in claim 1 wherein the said tube has positioned over the length of its inner surface a helical wire effective to prevent liquid from blocking the tube.

* * * * *